United States Patent [19]
Clare

[11] Patent Number: 5,441,075
[45] Date of Patent: Aug. 15, 1995

[54] SHOWER CONTROL VALVE ASEEMBLY

[75] Inventor: Manamohan Clare, Mississauga, Canada

[73] Assignee: Friedrich Grohe Aktiengesellschaft, Hemer, Germany

[21] Appl. No.: 323,456

[22] Filed: Oct. 14, 1994

[30] Foreign Application Priority Data

Oct. 21, 1993 [CA] Canada ................. 2109034

[51] Int. Cl.$^6$ ............................. F16K 11/16
[52] U.S. Cl. .................... 137/454.6; 137/98; 137/597; 137/607; 137/636.1
[58] Field of Search ............ 137/607, 100, 636.1, 137/98, 454.6, 597

[56] References Cited

U.S. PATENT DOCUMENTS

| | | | |
|---|---|---|---|
| 2,934,091 | 4/1960 | Chapou | 137/636.1 X |
| 3,342,214 | 9/1967 | Panerai et al. | 137/607 X |
| 3,724,480 | 4/1973 | Povalski et al. | 137/607 X |
| 3,921,659 | 11/1975 | Rudewick | 137/454.6 X |
| 4,022,242 | 5/1977 | Turecek | 137/100 X |
| 4,095,610 | 6/1978 | Priesmeyer | 137/100 |

FOREIGN PATENT DOCUMENTS 2176269 12/1986 United Kingdom .
2254131 9/1992 United Kingdom .

*Primary Examiner*—Stephen M. Hepperle
*Attorney, Agent, or Firm*—Herbert Dubno

[57] ABSTRACT

The invention relates to a shower control valve assembly which includes a casing mountable in a wall with inlets for hot and cold water. A cartridge is insertable into the casing in one of two orientations so that the hot water inlet of the cartridge can be aligned with either one of the casing inlets, depending on which one is the hot water inlet. The casing has two outlets, one for the shower and the other for the tub. There is an integral bypass which takes water from the tub outlet to the shower outlet upon activation of a diverter valve. The cartridge is of the pressure and temperature balancing type, with water of the desired temperature flowing to the tub outlet and then to the tub or shower as desired. The cartridge uses a rotatable mixing valve disc having arcuate ports therethrough for hot and cold water, each port being alignable with a corresponding passage in the cartridge that communicates with an inlet chamber for water of the appropriate temperature. The thickness of the valve disc at each port diminishes from a maximum to a minimum and a cam surface is provided adjacent each port. Within each passage is an axially movable seat member that has an annular surface in constant contact with the cam surface and an opposite annular surface that is sealable against an O-ring held by a snap seal member to prevent water flow through the seat member and the mixing valve disc. The snap seal member allows water flow therepast and is biased towards the disc, but when the axially movable seat member is in sealing contact with the O-ring, no water can pass to or through the valve disc. With this configuration wear is minimized and it is not necessary to use toxic lubricants to maintain smooth action of the valve disc.

12 Claims, 9 Drawing Sheets

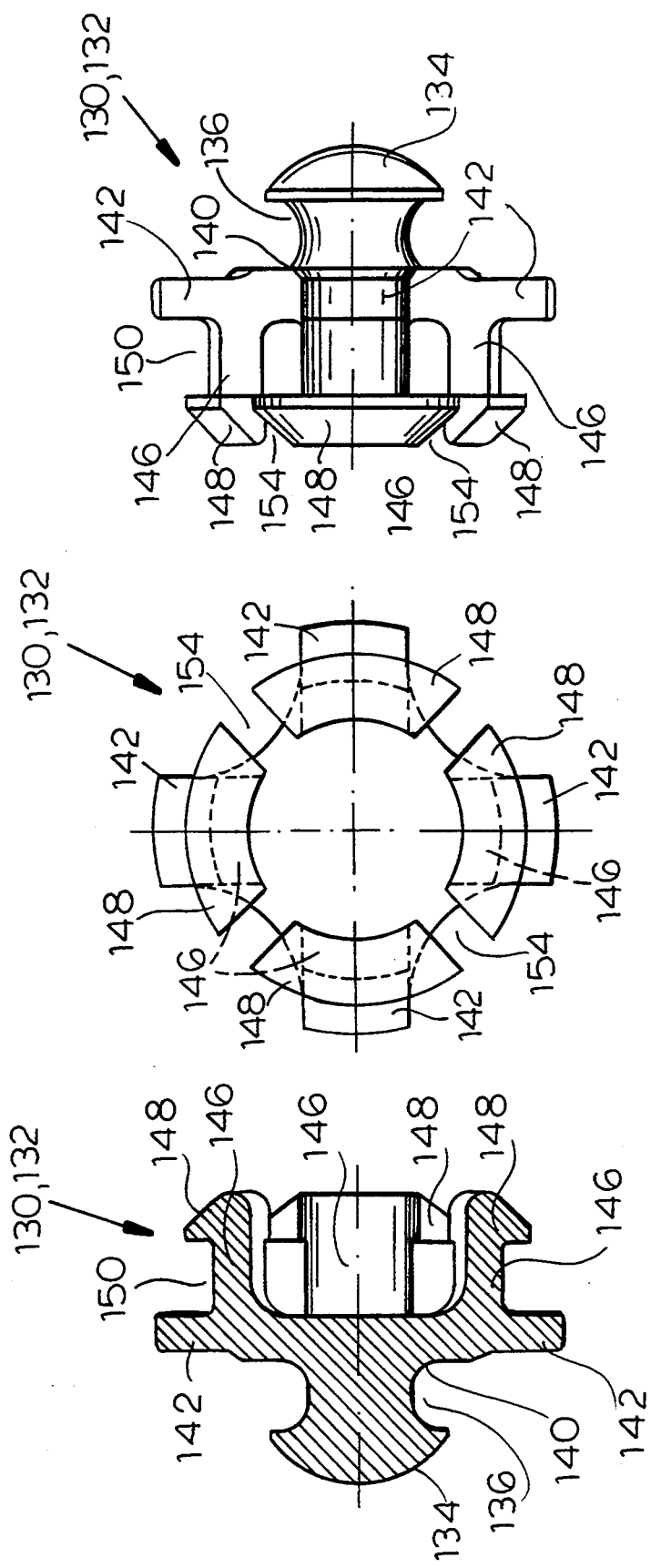

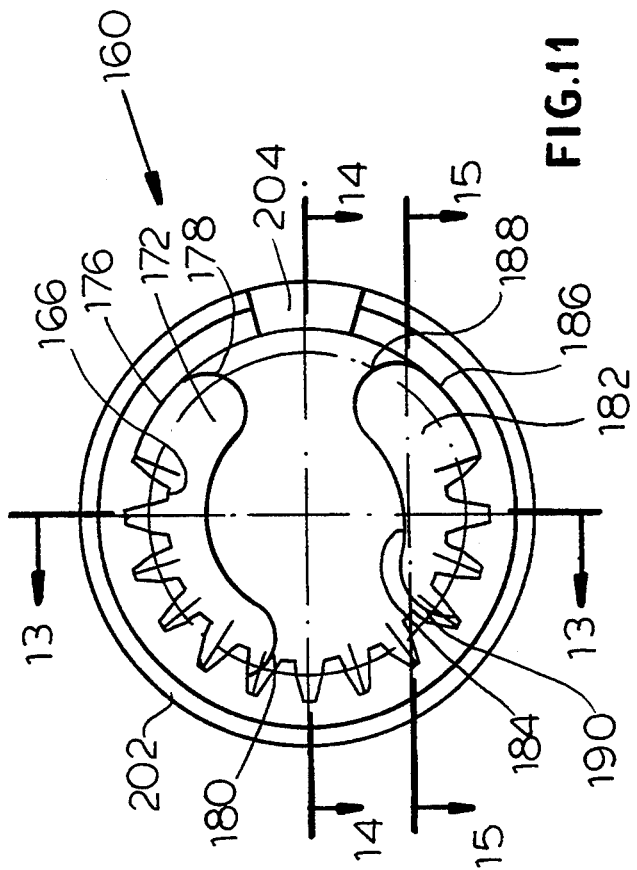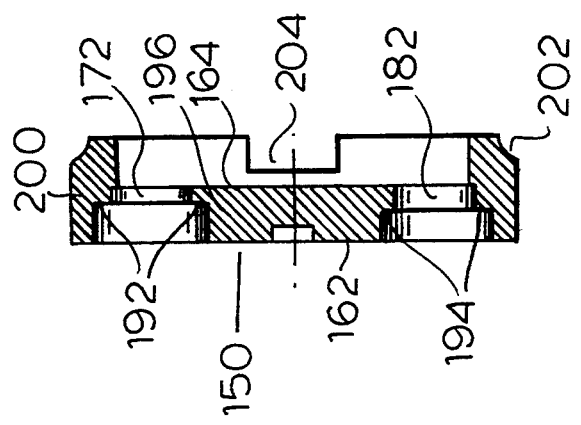

SHOWER CONTROL VALVE ASEEMBLY

This invention relates to a new and improved shower control valve assembly.

BACKGROUND OF THE INVENTION

In the construction of residential and commercial buildings it is common to have back-to-back bathrooms wherein the hot and cold water supply pipes service shower and tub units on opposite sides of the wall. Prior art shower control valves often have the cold water inlet on one side and the hot water inlet on the other side. As the two supply pipes in the wall are normally side-by-side, it is necessary to provide an awkward cross-over arrangement for one of the shower units. Later inventions provided shower control valve assemblies that utilise a casing having two inlets and a replaceable cartridge unit which can be adjusted in a relatively simple manner at the time of installation so that it is entirely optional as to which of the inlets is connected to the hot water supply pipe and which is connected to the cold water pipe. Commonly assigned Canadian Patent No. 1,050,853 of Mar. 20, 1979 discloses just such an arrangement. The valve assembly of that patent is pressure balanced, with a single handle to control the temperature and the pressure of the water issuing from the shower. The casing of the patented valve assembly included a single outlet leading to the shower, water for the tub flowing through a separate spout having a diverter valve associated therewith.

The trend in pressure balanced valve assemblies has been towards single handle control valves which are also adapted to control the flow of water to a tub as well as to a shower. U.S. Pat. Nos. 4,681,140; 4,901,750; and 4,905,732 all teach single handle pressure, temperature and/or volume balanced mixing valves.

One of the problems associated with any water flow arrangement is that of water hammer, generated noise which is frequently experienced in pressure sensing mixing valves when they are installed in line with quick closing faucets. Other problems involve cross flow between the hot and cold water supply lines; back flow in either or both of the supply lines; and wear of the rubber seal that contacts the mixing disc of the valve.

Commonly assigned Canadian Patent Application No. 2,076,924 filed Aug. 26, 1992 teaches a single handle pressure and temperature balancing mixing valve assembly that includes, among other features, a check valve at each of the hot and cold water inlets to prevent cross flow between the hot and cold water supply lines, to prevent back flow to either supply line, and to eliminate the effects of water hammer. Additionally, or optionally, the valve casing may include separate outlets for the tub and for the shower, with there being a built-in bypass or diverter channel to divert water from one outlet to the other and the entire valve cartridge may be rotated through 180° to reverse the hot and cold inlets.

Sealing of the water at the rotatable mixing valve disc in the aforementioned design is achieved through the utilization of cup-shaped rubber washers or glands which seal against the mixing disc. The disc can rotate through about 270° and the rubber washers are always in contact with the disc, held thereagainst by a spring and available water pressure. The rotational movement of the disc causes wear on the rubber washers. This problem may be overcome in some applications by the use of internal lubrication with a wax material. This lubrication solves the wear problem and reduces the torque required to turn the valve on and off. However, such internally lubricated washers usually do not qualify for contact with potable water due to bacterial growth and toxicity.

SUMMARY OF THE INVENTION

The present invention overcomes these problems by having the mixing disc in constant contact with a pair of axially movable seat members and by having each seat member contact a fixed O-ring seal in the closed position of the valve disc. The O-ring is free from contact with any of the moving components of the valve per se. Sealing contact of the O-ring is made only at the valve closing position, thus reducing torque and eliminating wear. Each axially movable seat member is made of a plastics plastic material having a low friction property. The seat members are held in contact with the mixing disc by water pressure only. A circular wave spring placed under a snap seal that holds the O-ring exerts enough force to seal the water at low supply pressures. The wave spring also takes up any slack due to the natural wear between the axial movable seat member and a cam surface on the mixing disc.

Generally speaking therefore the present invention may be defined as providing a shower control valve assembly comprising a casing having first and second water inlets and first and second water outlets therein and a cartridge shell insertable into the casing and having first and second separate inlet chambers in respective communication with the casing inlets. The inlet chambers are defined by an annular diaphragm member within the cartridge and a throttle valve unit centrally carried by the diaphragm. First and second check valve means within the throttle valve unit to prevent or allow water flow into the inlet chambers. Wall means within the cartridge have first and second passages to the first and second chambers respectively. A mixing valve disc is rotatably mounted in the cartridge in abutting engagement with the wall means, the casing having a discharge chamber on the side of the disc away from the inlet chambers and communicating with one of the water outlets. The disc has first and second ports cooperable with the passages to pass water from one or both of the inlet chambers to the discharge chamber. Each of the passages contains: an annular axially movable seat member having a first annular surface in constant engagement with cam means adjacent the corresponding port in the disc and a second annular surface axially opposite the first annular surface; and a snap seal member having retaining means engaging an internal flange of the passage, a button portion downstream of the retaining means, and an O-ring held by the button portion, the O-ring being sealingly engageable by the second annular surface to prevent water flow from the adjacent inlet chamber through the seat member and the mixing valve disc.

The invention may also be considered as a replaceable cartridge for a shower control valve assembly having a casing with first and second water inlets, first and second water outlets, and a discharge chamber communicating with one of the water outlets. The cartridge comprises a shell insertable into the casing and having first and second separate inlet chambers for respective communication with the casing inlets. The inlet chambers are defined by an annular diaphragm member within the shell and a throttle valve unit centrally carried by the diaphragm. First and second check valve means within the throttle valve unit prevent or allow water flow into said inlet chambers. Wall means in the cartridge have first and second passages extending to the first and second chambers respectively. A mixing valve disc is rotatably mounted in the cartridge in abutting engagement with the wall means, the disc having first and second ports co-operable with the passages to pass water from one or both of the inlet chambers to the casing discharge chamber. Each of the passages contains: an annular axially movable seat member having a first annular surface in constant engagement with cam means adjacent the corresponding port in the disc and a second annular surface axially opposite the first annular surface; and a snap seal member having retaining means engaging an internal flange of the passage, a button portion downstream of the retaining means, and an O-ring held by the button portion, the O-ring being sealingly engageable by the second annular surface to prevent water flow from the adjacent inlet chamber through the seal member and the mixing valve disc.

BRIEF DESCRIPTION OF THE DRAWINGS

FIGS. 8, 9 and 10 are end, side and sectional views respectively of the snap seal used in this invention.

FIGS. 11 and 12 are front and rear views of the mixing disc of this invention.

FIGS. 13, 14 and 15 are sectional views of the mixing disc on the lines 13—13, 14—14 and 15—15 respectively.

DESCRIPTION OF THE PREFERRED EMBODIMENT

Figure 1:
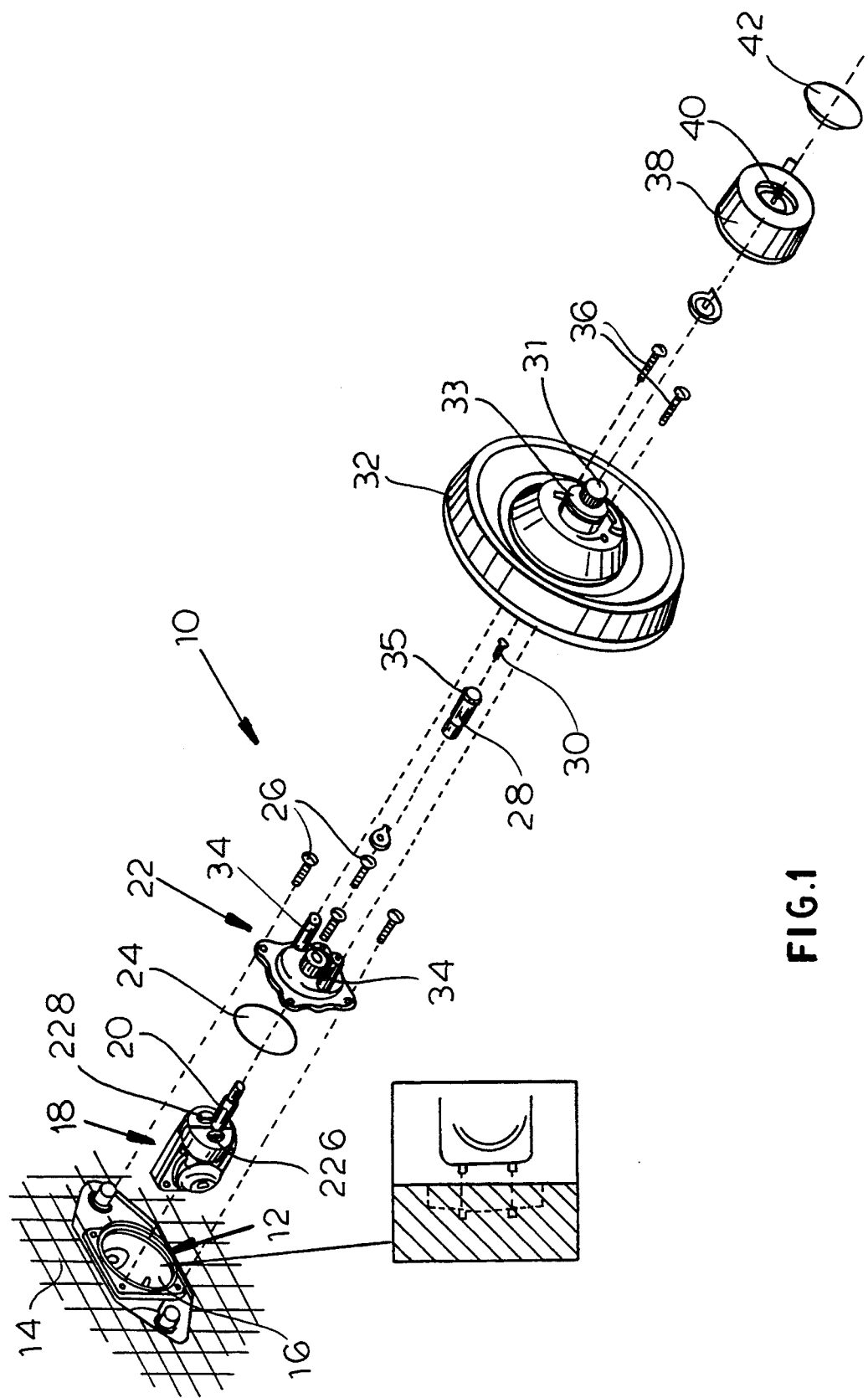
FIG. 1 is an exploded view of a shower mixing valve illustrating the main components of the invention.

Referring to FIG. 1 there is shown an exploded assembly view of the shower valve 10 of the present invention. A casing 12 is mounted in the wall 14 of the shower and is connected to the hot and cold water pipes (not shown), one being connected to the casing on each side thereof. The casing is also connected to outlet pipes (not shown) which lead to the shower head and to the tub faucet. The casing 12 has a central opening 16 which receives a mixing cartridge 18 to be described in greater detail hereinafter.

A cartridge 18 has a pinion shaft 20 extending therefrom and a cover 22, with sealing ring 24 interposed, is assembled to the casing 12 via machine screws 26. An intermediate shaft 28 extends through the cover 22 and is attached to the pinion shaft 20 by a machine screw 30. An escutcheon plate 32 covers the opening in the shower wall and is attached to elongated bosses 34 on the cover 22 by machine screws 36. A control knob 38 is attached to the intermediate shaft 28 by a machine screw 40 and has a removable cover 42 to hide the screw 40 from view.

Figure 2:
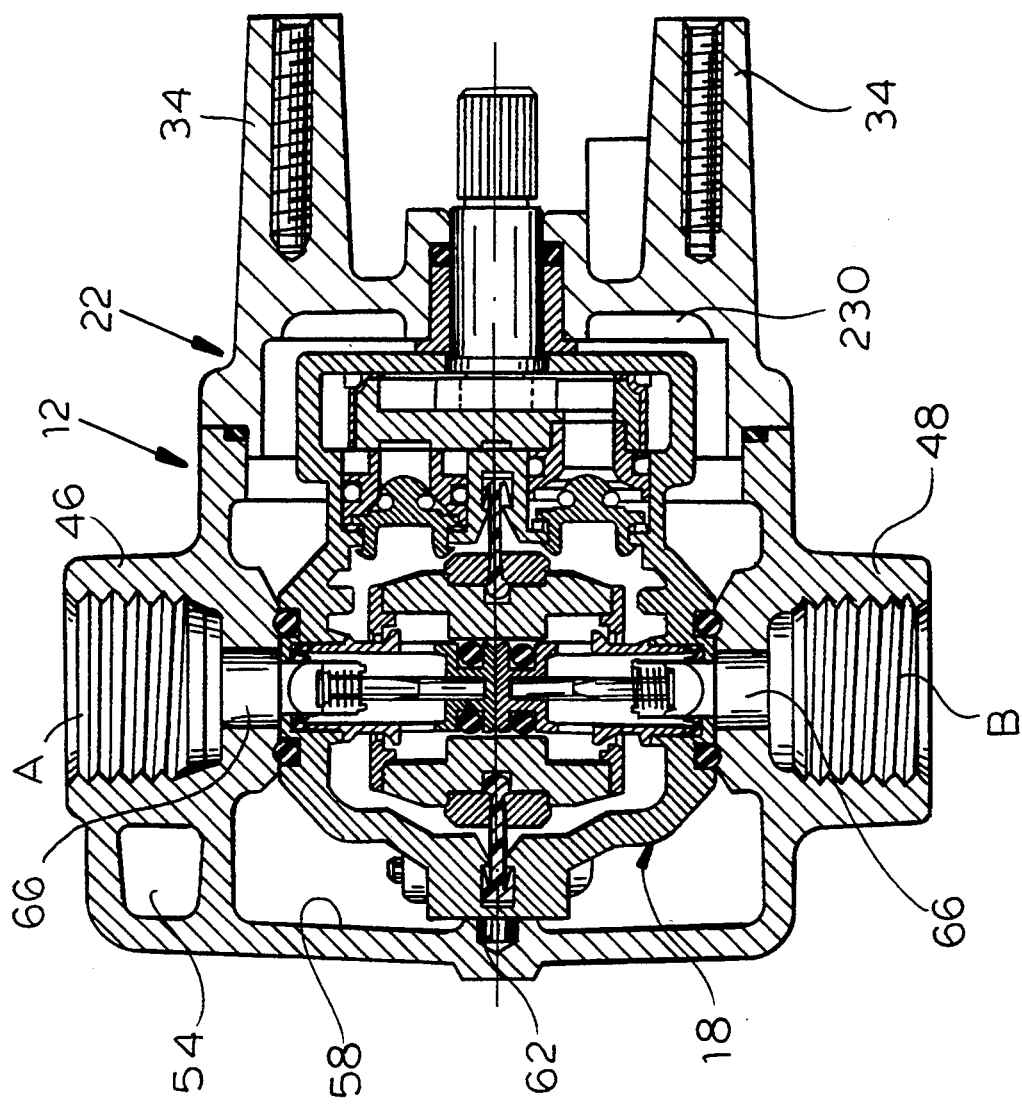
FIG. 2 is a sectional view on a horizontal plane of the casing with a mixing cartridge installed therein.
Figure 3:
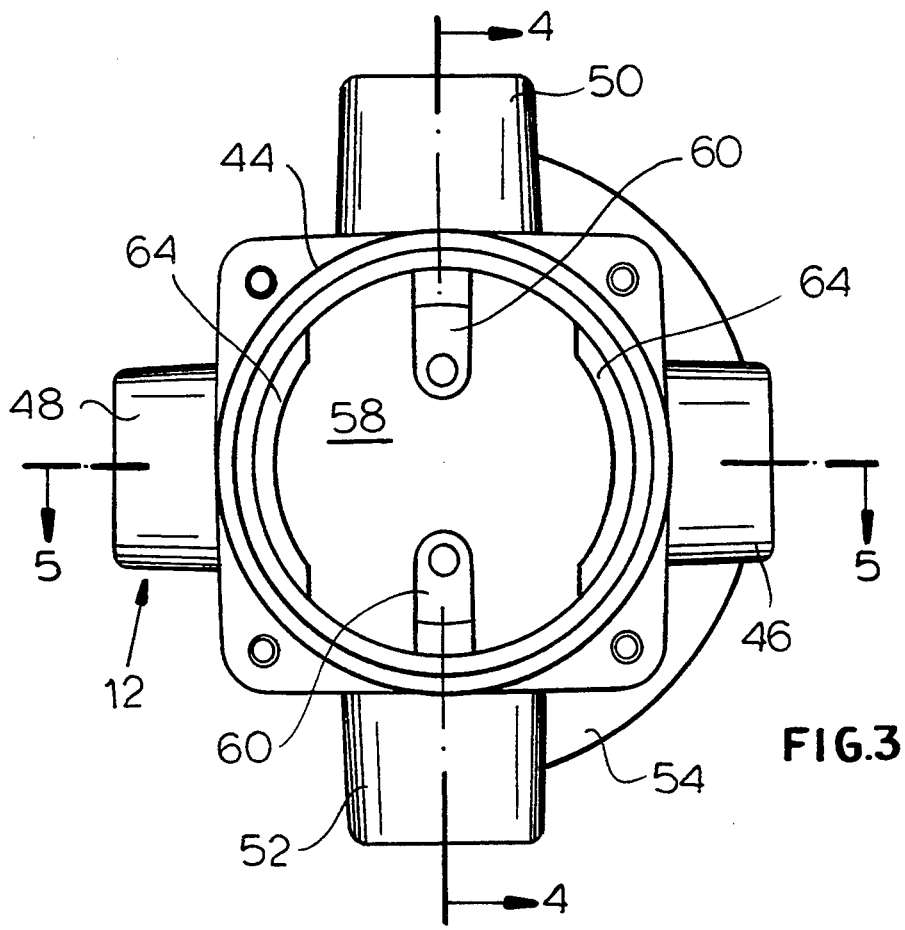
FIG. 3 is a front view of the casing with the cover thereof removed.
Figure 4:
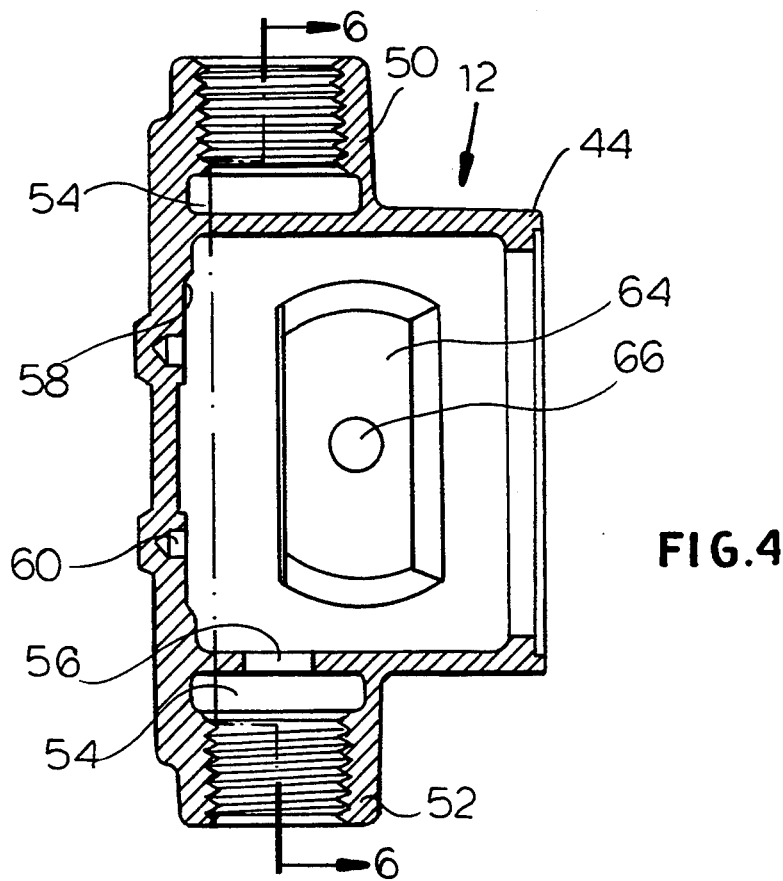
FIG. 4 is a sectional view of the casing on the line 4—4 of FIG. 3.
Figure 5:
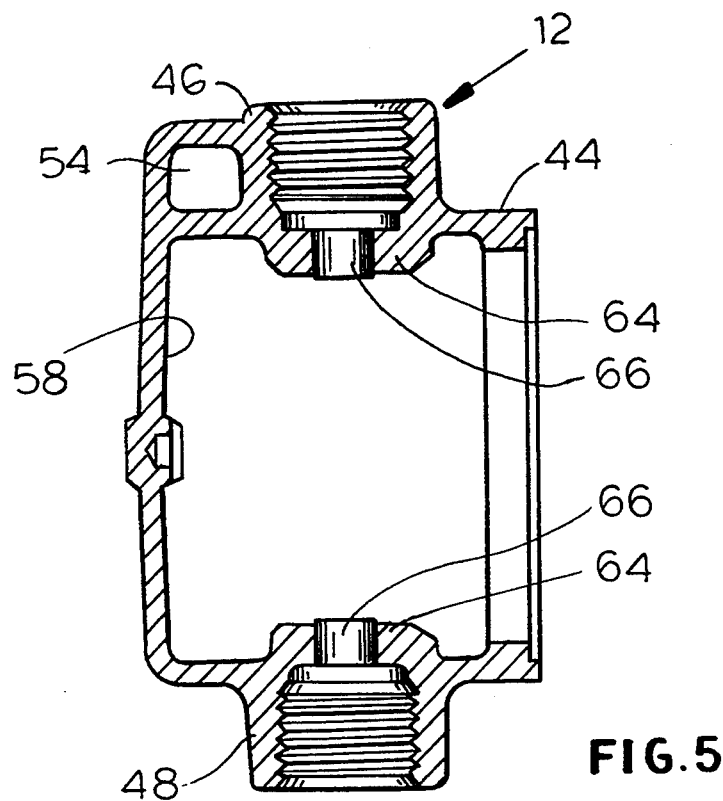
FIG. 5 is a sectional view of the casing on the line 5—5 of FIG. 3.
Figure 6:
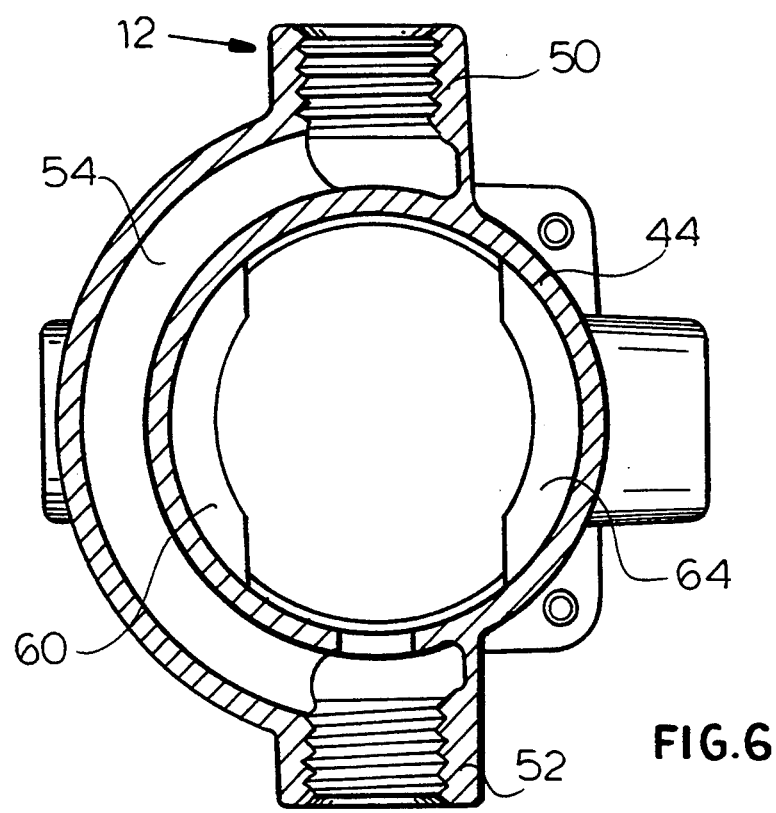
FIG. 6 is a sectional view of the casing on the line 6—6 of FIG. 4.

With reference to FIGS. 1 and 2, the casing 12 is normally mounted between the studs of a bathroom wall and, in the case of back-to-back installations in which there is a shower stall on each side of the wall, the hot and cold water supply pipes indicated by the letters A and B may be interchanged, with the present invention it is simply a matter of positioning the cartridge in one of two possible orientations so as to permit the supply A to be either hot or cold with the other supply being the opposite temperature.

The casing 12 is best seen in FIGS. 3 to 6. The casing is cast from brass and has a generally cylindrical section 44 with the optionally reversible hot and cold water inlets 46 and 48 on opposite sides thereof. Opposite discharge outlets 50 and 52 are provided, with the outlet 50 leading to the shower head and the outlet 52 leading to the tub faucet. A bypass 54 is integrally cast into the casing, interconnecting the outlets 50 and 52. Normally, outlet water will flow to the tub outlet 52 through an opening 56 in the casing wall. However, when the shower is to be used a separate diverter valve (not shown), below the outlet 52, will be activated to prevent water flowing through the outlet 52 and thereby forcing it through the bypass 54 to the shower outlet 50.

The closed, circular rear wall 58 of the casing 12 has a pair of elongated recesses 60 therein, which recesses are adapted to receive appropriate projections 62 on the rear of the cartridge, for positively locating the cartridge in the casing in either of its desired orientations. Arcuate bosses 64 on the inner side walls of the casing are provided for strength and each has an opening 66 therethrough for passage of the inlet water to the interior of the casing.

Figure 7:
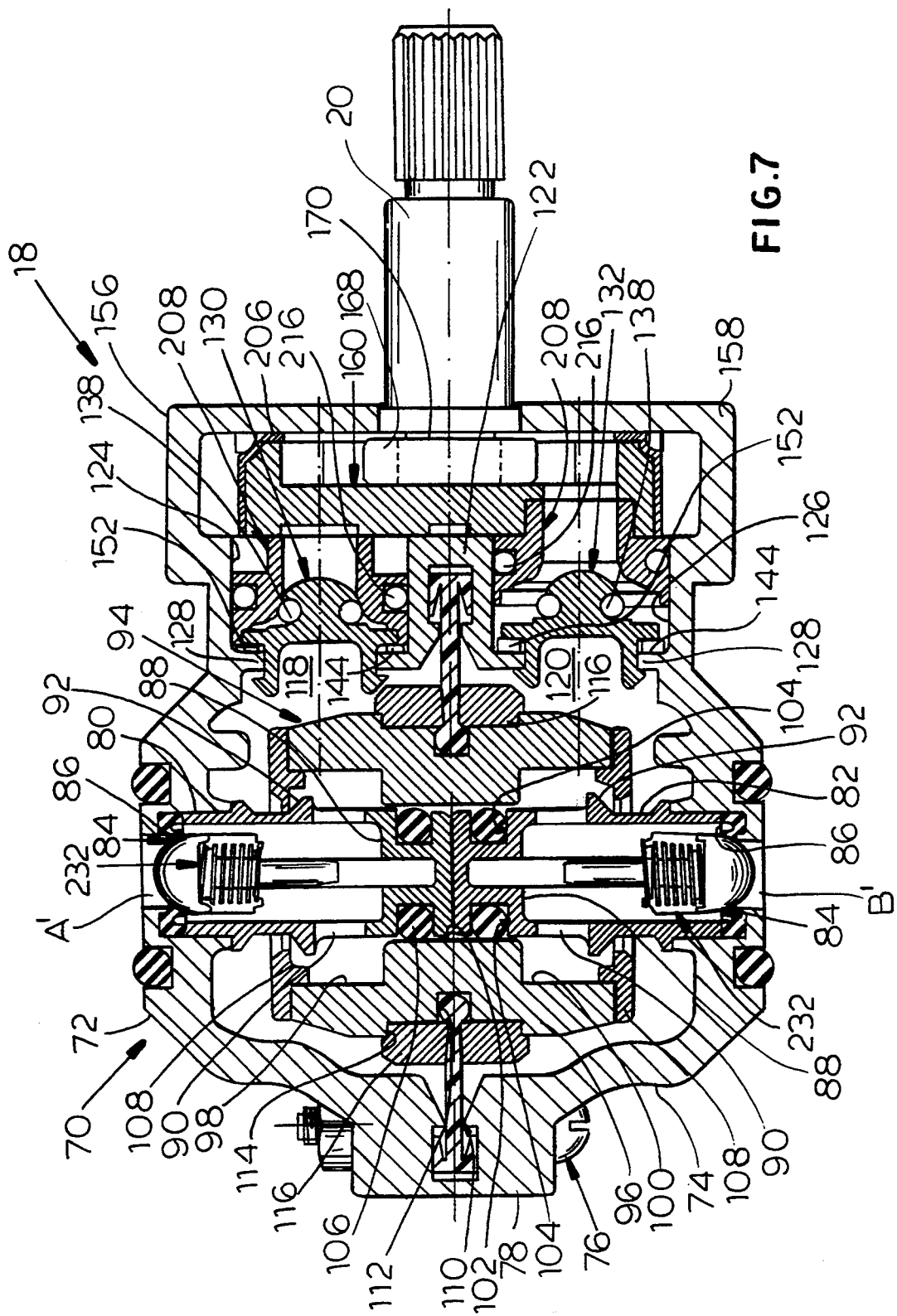
FIG. 7 is an enlarged sectional view of the mixing cartridge seen in FIG. 2.
Figure 15:
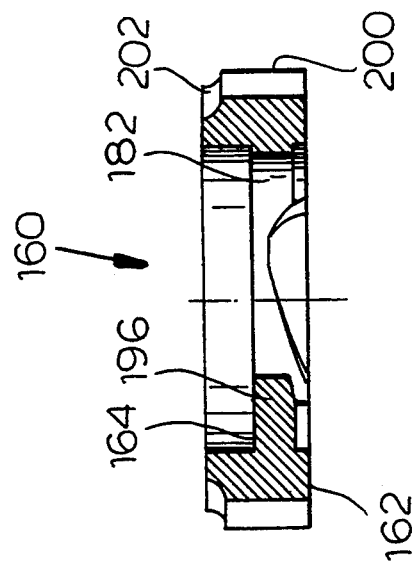
Figure 12:
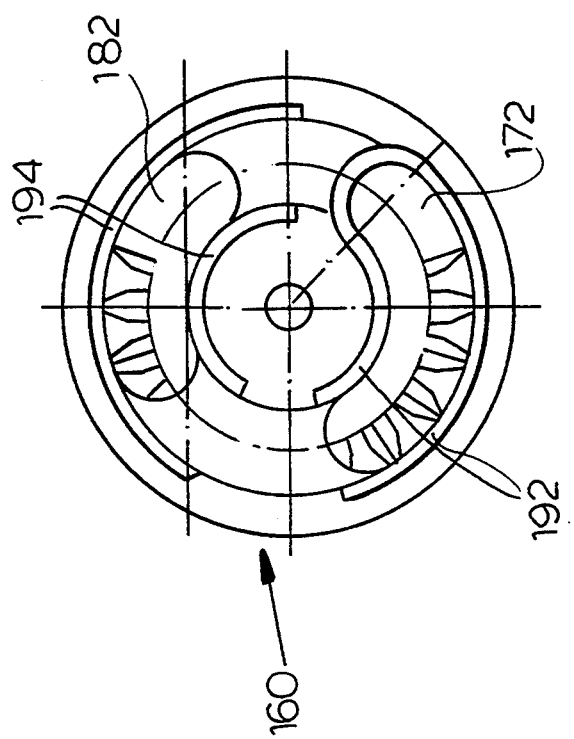
Figure 17:
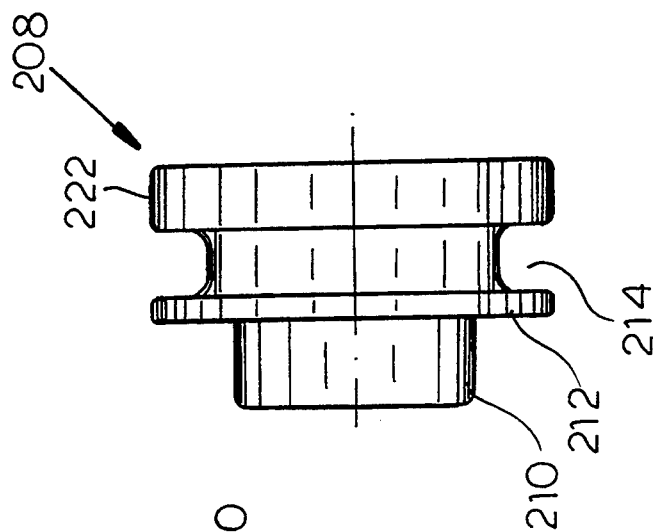
FIGS. 16, 17 and 18 are end, side and sectional views of the axially movable seat member used in this invention.
Figure 16:
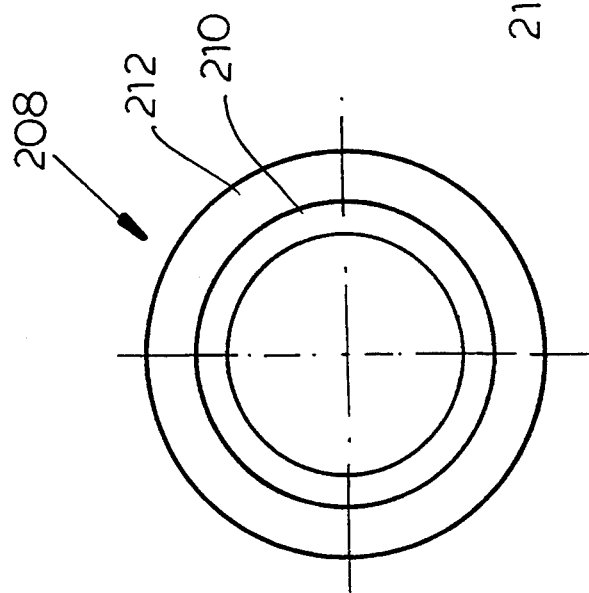
Figure 18:
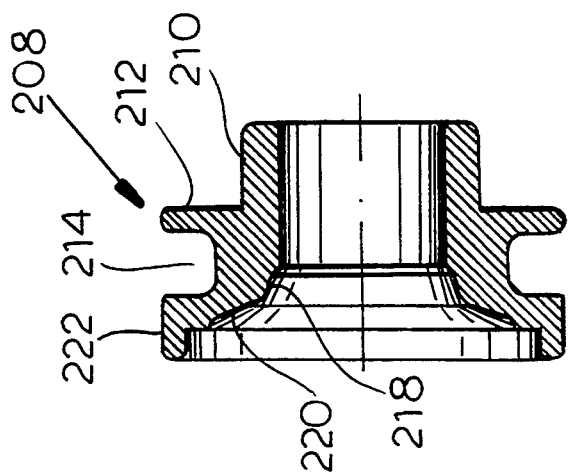

FIG. 7 is a view from the top of a replaceable cartridge unit 18 which is insertable into the casing 12. The cartridge has a shell 70 which comprises two halves 72 and 74 joined together by nut and bolt means 76 or by rivetting. The cartridge shell has a vertically and generally rectangularly shaped protuberance 78 carrying the projections 62 which fit into the casing recesses 60 when the cartridge 18 is inserted into the casing in either orientation.

Cartridge 18 is generally symmetrical relative to a central vertical plane. The letters A′ and B′ in FIG. 7 correspond to the letters A and B of FIG. 2 and represent hot and cold water inlets with either one being the hot water inlet and the other being the cold water inlet. The inlets A′ and B′ of the cartridge 18 are, when the cartridge is inserted, aligned with the casing inlets 46 and 48.

Tube members 80 and 82 are aligned with casing inlets 46 and 48 and are fixedly attached to the shell sections 72 and 74 respectively. Each tube member has an open outer end 84 defined by a sealing lip 86, a straight inner bore, a closed inner end 88 and egress openings 90 adjacent the inner end. Additionally, there is an annular collar 92 on the exterior of the tube member which constitutes a fixed seat co-operable with a throttle valve unit 94 to be described below.

The throttle valve unit referred to and described herein functions to maintain substantially constant water outlet temperature by compensating for relative changes in pressure of the hot and cold water supplied to the unit. The throttle valve unit shown in the drawings is similar in many respects to that shown in Canadian Patent No. 1,050,853 and is identical to that shown in copending Application No. 2,076,924. It is described herein so as to provide a complete understanding of the operation of the valve of this invention.

The throttle valve unit 94 includes an integrally moulded, generally cylindrical member 96 having large diameter counterbores 98, 100 extending thereinto from opposite ends. A central through bore 102 communicates the counterbore 98 with the counterbore 100, has an inside diameter nominally the same as the outside diameter of the tube members 80 and 82, and receives the abutting closed inner ends 88 of the tube members 80 and 82. An annular recess 104 in each tube member receives an O-ring 106 for sealing engagement with the bore 102. As there is a slip fit between the bore 102 and the tube members 80 and 82 the cylindrical member 96 is able to move relative to the stationary tube members 80 and 82.

A separate annular outer lip member 108 is fixed to the outer rim of each counterbore 98, 100 and cooperates with the collar 92 on the adjacent tube members 80, 82 in a manner to throttle the flow of water egressing from the openings 90. The axial movement of the cylindrical member 96 is such that an increase in the throttling of water flowing out of one set of openings 90 is accompanied by a decrease in the throttling of water flowing out of the other set of openings 90, and vice versa.

The throttle valve unit 94 also includes an annularly shaped diaphragm 110 made of a resilient material, such as ethylene propylene, and which has its outer periphery attached between the cartridge shell halves 72 and 74. The inner periphery of the diaphragm is received in a circumferential recess 112 within a wider recess 114 of the cylindrical member 96. A pair of resilient retainer members 116 act as clamping rings to hold the inner end of the diaphragm within the recess 112. The inner end of the diaphragm is movable with the cylindrical member and the diaphragm separates the interior of the cartridge shell into first and second interior chambers 118 and 120.

In operation, an increase in pressure on one side, such as in the tube member 80, reacts on the diaphragm 110 to move the cylindrical member 96 in a direction such that an increase in throttling occurs between the opposite collar 92 and throttling lip member 108.

Referring to the right side of FIG. 7 the shell halves 72, 74 are formed with a wall member 122 having two cylindrically shaped passages 124 and 126 each having an annular flange 128 at the inner end thereof. Ring-shaped snap seals 130 and 132 are respectively disposed in the passages 124 and 126 and are loosely retained in position by the flanges 128. The snap seals are shown in greater detail in FIGS. 8 to 10.

Each snap seal 130,132 is moulded from a suitable plastics material such as acetal. It includes a rounded button portion 134 defining therebelow a cylindrical recess 136 for reception of an O-ring 138 (FIG. 7). An inner circular portion 140 has four radially extending ears 142 leading therefrom, which ears are adapted to overlie the outer or downstream surface 144 of the flange 128. Extending downward (upstream) from the underside of the circular portion 140 and generally in alignment with the ears 142 are four generally rectangular legs 146, each of which terminates at an angled arcuate radially outwardly extending foot 148. The feet 148, legs 146 and ears 142 define an annular recessed zone 150 which receives the flange 128 therein. The height of the zone 150 is greater than the thickness of the flange 128 so that there can be a small amount of relative movement between the flange and the snap seal. In order to bias the snap seal away from the flange 128 a wave spring 152 is positioned between the downstream flange surface 144 and the underside of the ears 142, as best seen in FIG. 7. The gap 154 between adjacent ears, legs and feet of the snap seal allows for the free flow of water from the chambers 118, 120 into the passage 124, 126 respectively.

Extending to the right of cartridge wall member 122 are casing portions 156 and 158 which form an annular ring portion. Within this ring portion, and in abutting engagement with the wall member 122, is a mixing valve disc member 160. With reference as well to FIGS. 11 to 15 it will be seen that the disc member 160 is generally cylindrical in form, that it has an inner flat surface 162, and a generally annular recess 164 in the opposite outer surface.

Formed within the wall of the recess 164, and extending over about 200° is a plurality of gear teeth 166. These teeth are engageable by the corresponding mating teeth 168 of a pinion gear 170 mounted to the inner end of the pinion shaft 20. Rotation of the pinion gear 170 by the pinion shaft 20 will result in rotation of the mixing disc valve member 160.

A first generally arcuate port 172 extends through the inner wall of the member 160, the port 172 having arcuate edges 174, 176, and arcuate end walls 178, 180. This port serves the hot water flow through the member 160. Generally diametrically opposite the port 172 is a second port 182 which has a similar, but shorter shape and serves the cold water flow through the member 160. The port 182 includes arcuate edges 184 and 186 as well as arcuate end edges 188,190.

The ports 172 and 182 are bordered along their edges 174, 176 and 184,186 respectively by sloping cam surfaces 192 and 194 which follow the progressive thinning of the disc's inner wall 196 from the maximum thickness seen in FIG. 14 to the minimum thickness seen in FIG. 13. The cam surfaces 192 are parallel to each other, as are the surfaces 194, although the former are joined by an arcuate continuation 198 of those cam surfaces.

The outer edge of the disc 160 has a wall 200 that borders the recess 164, the wall having a convex corner 202. There is also a rectangular cutout 204 in the wall 202 between the ports 172 and 182. A disc bearing 206 (FIG. 7) covers the disc 160 and is moulded from a material such as acetal. The bearing 206 has a cutout corresponding to the cutout 204 in the disc wall.

With reference to FIGS. 7 and 16 to 18 there is shown a cylindrical annular movable seat member 208 positioned between each of the snap seals 130, 132 and the disc member 160. The seat member is also formed of a material such as acetal and includes a tube portion 210 having a rounded end and an inner annular flange 212. Below the flange is an annular recess 214 for reception of an O-ring 216 (FIG. 7), the latter serving to seal the seat member within the opening 124 or 126. The inner end of the seat member 208 has angled annular surfaces 218, 220 which lead to an axial flange 222 adapted to surround the flange 128 of the adjacent snap seal when the seat member is sealed against the O-ring 138 received in the recess 136 of the snap seal.

The ports 172 and 182 lead to the recess 162 within the mixing valve disc 160. A pair of holes 226 and 228 in the end wall of the cartridge (see FIG. 1) lead to a discharge or mixing chamber 230 defined within the inner surface of the cover 22 (FIG. 2). The mixing chamber leads, in turn, to the outlet opening 56 that leads to the tub outlet 52. Rotation of the pinion shaft 20 rotates the pinion gear 168 to rotate the valve disc 160 and thus bring, progressively, one or the other of the openings 172, 182 into greater registry with the adjacent passage 124, or 126. Such rotation causes the cam surfaces 194, 196 to act on the adjacent axially movable seat members 208 to alter the gap between the surfaces 218, 220 and the adjacent O-ring 138 so as to increase or decrease the flow of cold or hot water through the gap into the mixing chamber and hence to the tub (or shower) outlet.

The seat members 208 are constantly biassed against the appropriate cam surfaces by water pressure within the chambers 118, 120 and the passages 124, 126. When the seat member is in its valve closed position (the upper seat member of FIG. 7) the sealing action of the O-ring 138 against the angled surface 218 is augmented by the force exerted by the wave spring 152. As the valve disc is rotated to increase water flow the water pressure will move the seat member so as to maintain contact between the seat member and the adjacent cam surface and allow water to flow past the snap seal.

FIG. 7 also illustrates the check valve structure 232 which is an important component of the valve cartridge and is described and claimed in detail in copending Canadian application no. 2,076,924. Accordingly the check valve structure will not be described in detail herein. Although it is an important element of the valve cartridge it is not essential to the specific invention claimed herein.

The cartridge of the present invention is completely self-contained in that the pinion gear and the pinion shaft are an integral part of the cartridge as presented to the installation expert. He need only orient the cartridge one way or the other to have the hot water coming into the hot water side of the cartridge, thereby compensating for installation situations in which the hot and cold water supplies are positioned opposite to what might be expected. Furthermore, by providing an integral bypass between the tub and shower outlets in association with a built-in diverter valve it is not necessary to provide additional plumbing, a considerable expense in time and supplies. With the arrangement of a snap seal carrying an O-ring and cooperating with an axially movable seat member which is always in contact with the mixing disc it is possible to better control the flow of water while avoiding the problems of the prior art occasioned by wear. Finally, by providing the check valve members within the cartridge, many of the operating problems associated with these mixing valves have been eliminated.

I claim:

1. A shower control valve assembly comprising: a casing having first and second water inlets and first and second water outlets therein; a cartridge shell insertable into said casing and having first and second separate inlet chambers in respective communication with said casing inlets; said inlet chambers being defined by an annular diaphragm member within said cartridge and a throttle valve unit centrally carried by said diaphragm; first and second check valve means within said throttle valve unit to prevent or allow water flow into said inlet chambers; wall means having first and second passages to the first and second chambers respectively; a mixing valve disc rotatably mounted in said cartridge in abutting engagement with said wall means; the casing having a discharge chamber on the side of said disc away from said inlet chambers and communicating with one of said water outlets; and said disc having first and second ports co-operable with said passages to pass water from one or both of said inlet chambers to said discharge chamber; each of said passages containing: an annular axially movable seat member having a first annular surface in constant engagement with cam means adjacent the corresponding port in said disc and a second annular surface axially opposite the first annular surface; and a snap seal member having retaining means engaging an internal flange of said passage, a button portion downstream of said retaining means, and an O-ring held by said button portion, said O-ring being sealingly engageable by said second annular surface to prevent water flow from the adjacent inlet chamber through the mixing valve disc.

2. The valve assembly of claim 1 wherein each of said ports in said mixing valve disc is generally arcuate in form, with one being longer than the other, the thickness of the mixing valve disc diminishing smoothly between maximum and minimum values along the length of each arcuate port.

3. The valve assembly of claim 2 wherein said cam means for each port comprises a narrow, smooth cam surface extending along each arcuate edge of said port along the length thereof, said first surface of the adjacent axially movable member being biased towards said cam surfaces by water pressure in the passage containing the axially movable seat member.

4. The valve assembly of claim 3 wherein each said snap seal member retaining means includes a plurality of ears directed radially outwardly from below said button portion to overlie a downstream surface of said internal flange, a leg member directed axially away from said button portion in line with each ear, and a foot member directed radially outwards from each leg to overlie the upstream surface of said internal flange, said ears and said button portion defining an annular recess in which said O-ring is retained.

5. The valve assembly of claim 4 including a resilient, flexible wave spring positioned between said flange downstream surface and said snap seal member ears to bias said snap seal member in a downstream direction, towards said mixing valve disc.

6. The valve assembly of claim 1 in which said snap seal member and said axially movable seat member are moulded from a non-toxic plastics material.

7. A replaceable cartridge for a shower control valve assembly having a casing with first and second water inlets, first and second water outlets, and a discharge chamber communicating with one of the water outlets, said cartridge comprising: a shell insertable into said casing and having first and second separate inlet chambers for respective communication with said casing inlets; said inlet chambers being defined by an annular diaphragm member within said shell and a throttle valve unit centrally carried by said diaphragm; first and second check valve means within said throttle valve unit to prevent or allow water flow into said inlet chambers; wall means having first and second passages to the first and second chambers respectively; and a mixing valve disc rotatably mounted in said cartridge in abutting engagement with said wall means, said disc having first and second ports co-operable with said passages to pass water from one or both of said inlet chambers to the casing discharge chamber; each of said passages containing: an annular axially movable seat member having a first annular surface in constant engagement with cam means adjacent the corresponding port in said disc and a second annular surface axially opposite the first annular surface; and a snap seal member having retaining means engaging an internal flange of said passage, a button portion downstream of said retaining means, and an O-ring held by said button portion, said O-ring being sealingly engageable by said second annular surface to prevent water flow from the adjacent inlet chamber through the seat member and the mixing valve disc.

8. The cartridge of claim 7 wherein each of said ports in said mixing valve disc is generally arcuate in form, with one being longer than the other, the thickness of the mixing valve disc diminishing smoothly between maximum and minimum values along the length of each arcuate port.

9. The valve assembly of claim 8 wherein said cam means for each port comprises a narrow, smooth cam surface extending along each arcuate edge of said port along the length thereof, said first surface of the adjacent axially movable seat member being biased towards said cam surfaces by water pressure in the passage containing the axially movable seat member.

10. The valve assembly of claim 9 wherein each said snap seal member retaining means includes a plurality of ears directed radially outwardly from below said button portion to overlie a downstream surface of said internal flange, a leg member directed axially away from said button portion in line with each ear, and a foot member directed radially outwards from each leg to overlie the upstream surface of said internal flange, said ears and said button portion defining an annular recess in which said O-ring is retained.

11. The valve assembly of claim 10 including a resilient, flexible wave spring positioned between said flange downstream surface and said snap seal member ears to bias said snap seal member in a downstream direction, towards said mixing valve disc.

12. The valve assembly of claim 7 in which said snap seal member and said axially movable seat member are moulded from a non-toxic plastics material.

* * * * *